United States Patent
Liu et al.

(10) Patent No.: US 10,277,358 B2
(45) Date of Patent: Apr. 30, 2019

(54) METHODS FOR PERFORMING LINK ADAPTATION AND RELATED BASE STATIONS

(71) Applicant: Telefonaktiebolaget L M Ericsson (publ), Stockholm (SE)

(72) Inventors: Jinhua Liu, Beijing (CN); Yu Qian, Beijing (CN); Hai Wang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 587 days.

(21) Appl. No.: 14/430,595

(22) PCT Filed: Sep. 26, 2012

(86) PCT No.: PCT/CN2012/082053
§ 371 (c)(1),
(2) Date: Mar. 24, 2015

(87) PCT Pub. No.: WO2014/047815
PCT Pub. Date: Apr. 3, 2014

(65) Prior Publication Data
US 2015/0236814 A1    Aug. 20, 2015

(51) Int. Cl.
*H04L 1/00* (2006.01)
*H04L 1/18* (2006.01)
*H04L 1/20* (2006.01)

(52) U.S. Cl.
CPC .......... *H04L 1/0009* (2013.01); *H04L 1/0003* (2013.01); *H04L 1/0021* (2013.01);
(Continued)

(58) Field of Classification Search
CPC ... H04L 1/0009; H04L 1/0003; H04L 1/1812; H04L 1/203; H04L 1/1829
See application file for complete search history.

(56) References Cited

U.S. PATENT DOCUMENTS

| | | | | |
|---|---|---|---|---|
| 2008/0096573 | A1* | 4/2008 | Chu | H04W 72/0426 455/450 |
| 2012/0069757 | A1* | 3/2012 | Jiang | H04B 7/0404 370/252 |

(Continued)

FOREIGN PATENT DOCUMENTS

| CN | 102215534 | 10/2011 |
|---|---|---|
| CN | 102281119 | 12/2011 |

(Continued)

OTHER PUBLICATIONS

International Search Report for International application No. PCT/CN2012/082053, dated Jul. 4, 2013.

(Continued)

*Primary Examiner* — Hashim S Bhatti
(74) *Attorney, Agent, or Firm* — Patent Portfolio Builders, PLLC (57) ABSTRACT

The present disclosure relates to a link adaptation scheme. In one embodiment, there provides a method for performing link adaptation in an uplink subframe for a first cell, the method comprising: obtaining interference to the uplink subframe of the first cell from at least one neighboring cell's downlink subframe occupying a time interval same as the uplink subframe; determining whether the obtained interference exceeds a predetermined threshold; and applying to the uplink subframe a first link adaptation loop when the obtained interference exceeds the predetermined threshold.

32 Claims, 8 Drawing Sheets

(52) U.S. Cl.
CPC .......... *H04L 1/1812* (2013.01); *H04L 1/1829* (2013.01); *H04L 1/203* (2013.01)

(56) References Cited

U.S. PATENT DOCUMENTS

| | | | | |
|---|---|---|---|---|
| 2013/0182660 A1* | 7/2013 | Takekawa | ........... | H04W 72/082 370/329 |
| 2013/0188502 A1* | 7/2013 | Yang | ..................... | H04W 28/16 370/252 |
| 2013/0343241 A1* | 12/2013 | Niu | ........................ | H04B 15/00 370/280 |
| 2015/0236808 A1* | 8/2015 | Liu | ...................... | H04J 11/0056 370/252 |

FOREIGN PATENT DOCUMENTS

| | | |
|---|---|---|
| CN | 102281638 | 12/2011 |
| CN | 102333377 | 1/2012 |

OTHER PUBLICATIONS

PCT Notification of Transmittal of the International Search Report and the Written Opinion of the International Searching Authority, or the Declaration for International application No. PCT/CN2012/082053, dated Jul. 4, 2013.

3GPP TR 36.828 V2.0.0 (Jun. 2012) 3rd Generation Partnership Project; Technical Specification Group Radio Access Network; Further Enhancements to LTE TDD for DL-UL Interference Management and Traffic Adaptation (Release 11).

\* cited by examiner

METHODS FOR PERFORMING LINK ADAPTATION AND RELATED BASE STATIONS

PRIORITY

This nonprovisional application is a U.S. National Stage Filing under 35 U.S.C. § 371 of International Patent Application Serial No. PCT/CN2012/082053, filed Sep. 26, 2012, and entitled "METHODS FOR PERFORMING LINK ADAPTATION AND RELATED BASE STATIONS."

TECHNICAL FIELD

The disclosure relates to link adaptation, and more particularly, to methods for performing link adaptation in a cellular radio system and related base stations.

BACKGROUND

Unless otherwise indicated herein, the approaches described in this section are not prior art to the claims in this application and are not admitted to be prior art by inclusion in this section.

The dynamic UL DL sub-frame configuration is being studied in 3GPP and Ministry of Industry and Information Technology (MIIT) of China shows great interest. In the latter, dynamic uplink downlink subframe configuration (referred as dynamic TDD for simplicity later on) is identified as one of the key features to improve the performance in hot spot and indoor scenario.

Figure 1:
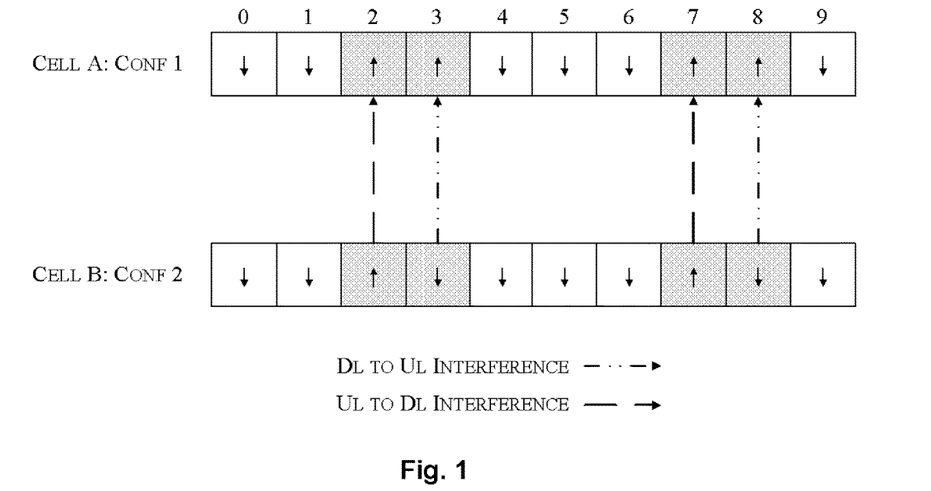
FIG. 1 exemplifies an example of two neighboring cells with different TDD configurations.

With dynamic TDD, the neighboring cells can be configured with different uplink downlink subframe configurations. FIG. 1 exemplifies the uplink interference source difference when the two neighboring cells are configured with different UL DL subframe configurations. Cell A and B are configured with TDD subframe configuration 1 and 2 respectively. In Cell A, Subframes 2 and 7 experience the interference from the uplink transmission of the UE in Cell B, while Subframes 3 and 8 experience the interference from the downlink transmission in Cell B.

In downlink, the PDCCH is specified to be transmitted in the first 1 to 3 symbols according to the configured CFI. In uplink, the PUCCH is specified to be transmitted over the side PRBs.

Figure 2:
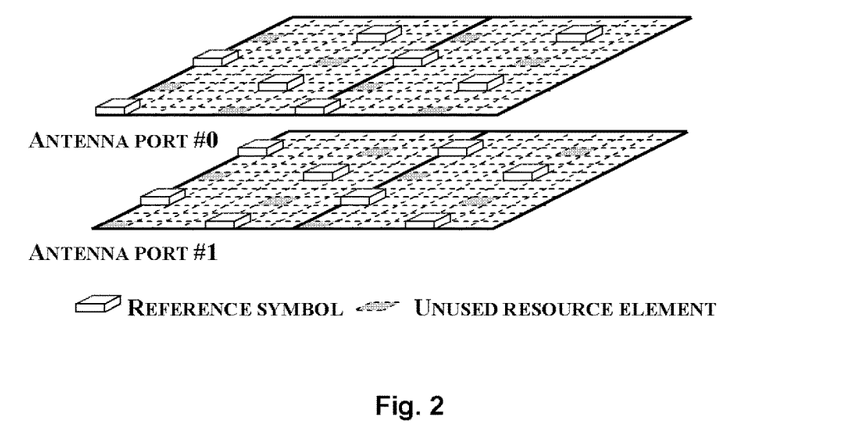
FIG. 2 shows an example of downlink cell-specific reference signal with two antenna ports.
Figure 3:
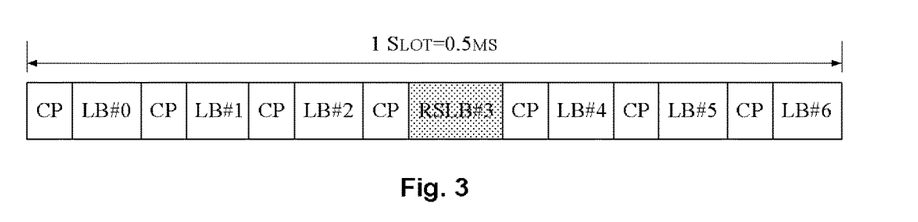
FIG. 3 shows an example of uplink demodulation reference signals (DM-RSs)

FIGS. 2 and 3 show frame structures of CRS and uplink DM-RS, respectively.

- Subframes 3, 8 are configured as downlink subframes for Cell B but uplink subframe for Cell A. For Cell B, in these subframes, the transmitted signal in the control region and the CRS from cell B do not interfere the uplink DM-RS but interfere some data symbols in the uplink of Cell A. Hence, it is difficult to ensure the radio channel quality measurement and estimate accuracy.
- Subframes 2 and 7 are configured as uplink subframes in both Cell A and Cell B. In the uplink, the channel quality measurement and estimation accuracy can be ensured since uplink DM-RS symbols experience the similar interference as the data symbols since the UE transmits signals over all the symbols of the allocated PRBs.

Link adaptation is supposed to adapt the transmit data rate according to the radio condition, available time-frequency resource, buffer status, the predefined parameters and the like, so that the system performance and/or the user experience can be optimized.

A simple example of uplink adaptation is described below. Without impact of describing the invention, it is assumed that the UE has full buffer traffic. Over the scheduled PRBs for the UE, the SINR is measured in every subframe for MCS selection in the coming subframes. In order to maintain a predetermined BLER target, a delta value which is adapted based on the PUSCH CRC check status is used to conquer the measurement error, the variation of the channel and the interference. Then the effective SINR over the allocated PRBs in the current uplink subframe may be expressed as Equation 1:

$$efffectiveSINR = measSINR + \Delta_{adapted} \qquad \text{Equation 1}$$

Herein, measSINR is the measured SINR over the used uplink PRBs in the current subframe; $\Delta_{adapted}$ is the said delta value; and effectiveSINR is the expected effective SINR.

The maximum available SINR when certain number of PRBs is allocated may be estimated as Equation 2:

$$effectiveSINR = \qquad \text{Equation 2}$$
$$measSINR + \Delta_{adapted} + PH + lin2\ dB\left(\frac{N_{PRB,meas}}{N_{PRB,x}}\right)(\text{in dB})$$

Here, PH is the uplink power headroom which is defined in 36.211; $N_{PRB,meas}$ is the number of used PRBs in the current uplink subframe; and $N_{PRB,x}$ is one of the possible numbers of PRBs that can be allocated in a coming uplink subframe.

As one example, $\Delta_{adapted}$ can be adapted using a jump algorithm as illustrated in Equation 3. A decrease in a full step size is applied when there is a PUSCH decoding failure and a proportional increase to the BLER target is applied when there is a PUSCH decoding success.

$$\Delta_{adapted} = \qquad \text{Equation 3}$$
$$\begin{cases} \Delta_{adapted} - StepSize & (PUSCH \text{ decoding failure}) \\ \Delta_{adapted} + StepSize \cdot \dfrac{BLER}{1-BLER} & (PUSCH \text{ decoding success}) \end{cases}$$

In practice, there may be certain optimization considering various factors, for instance the tradeoff between the PRB allocation and the user power efficiency, the inter-cell interference, and the user experience. As one example from the system performance optimization perspective, when there are many users with uplink traffic in the cell, the cell may try to schedule multiple users in one uplink subframe and each of the scheduled users is only allocated with part of the available uplink PRBs. Then, the user can have high effective SINRs and be scheduled with high MCSs compared to a case where only a single user is scheduled in the subframe statistically.

When the dynamic TDD is deployed, the interference characteristics, the radio quality measurement and estimate accuracy between different uplink subframes may be quite different when the neighboring cells are configured with different UL DL subframe configurations. For a certain subframe, when all the neighboring cells configure it as an uplink subframe, the interference in the subframe in each cell may be well estimated since the interference impact from the neighboring cells is included in the channel estimation. When some of the neighboring cells (referred to as Cell Set DL for the subframe) configure the subframe as a downlink subframe but other cells (referred to as Cell Set UL for the subframe) still set the subframe as an uplink subframe, due to the fact that the uplink channel estimation cannot fully capture the interference impact of the CRS and PDCCH from Cell Set DL, Cell Set UL may under-estimate the interference, thereby over-estimating the SINR. This is extremely true when there are only CRS and PDCCH transmitted over the subframe by any one of Cell Set DL.

For certain subframe, in the Cell Set UL, the interfered uplink subframe by the downlink transmission of Cell Set DL can trigger to produce a very conservative delta value when a single common uplink adaptation loop is applied for all the uplink subframes. This may seriously deteriorate the uplink subframes that do not experience the interference from the downlink transmission of any neighboring cells.

Figure 4A:
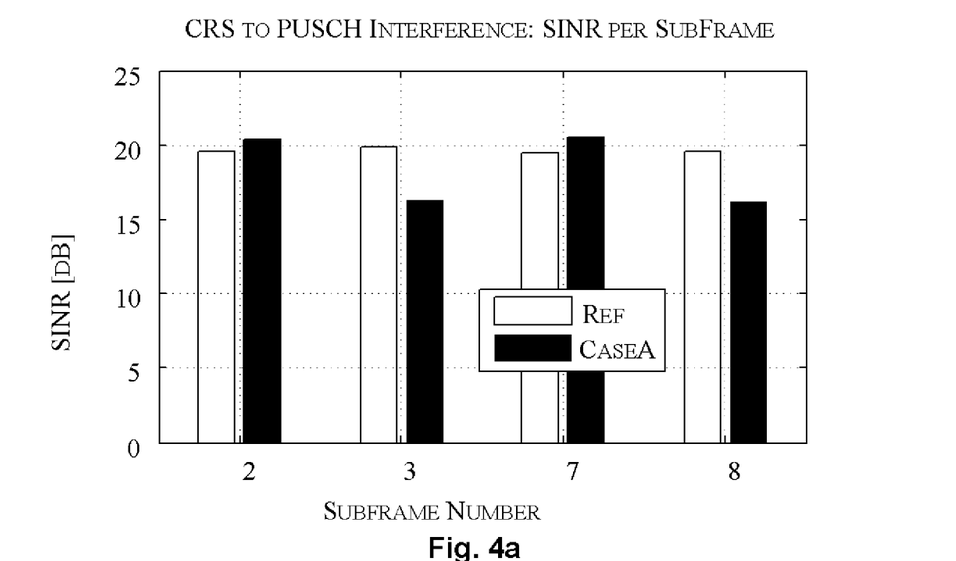
FIG. 4a illustrates uplink performance (SINR per subframe) when there is only CRS to PUSCH interference.
Figure 4B:
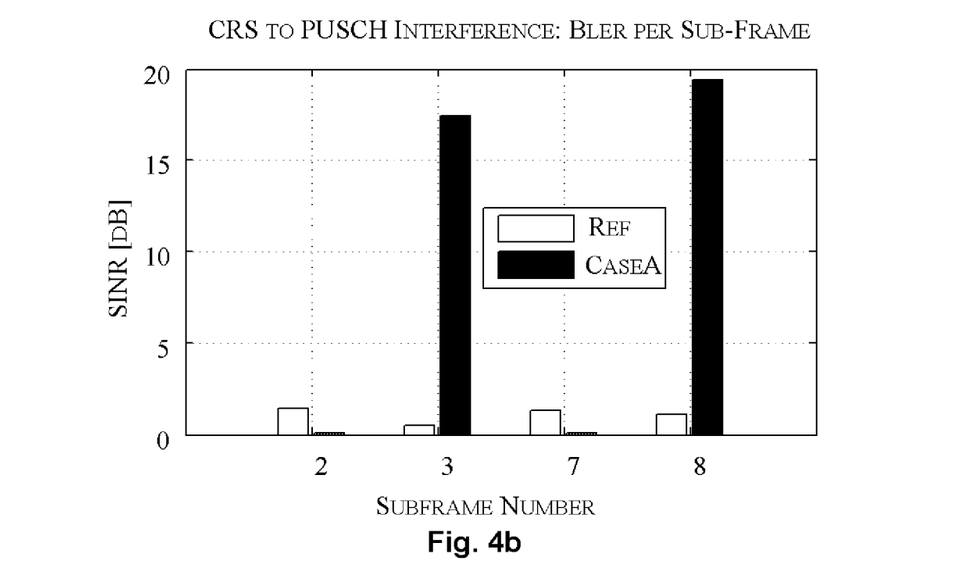
FIG. 4b illustrates uplink performance (BLER per subframe) when there is only CRS to PUSCH interference.
Figure 4C:
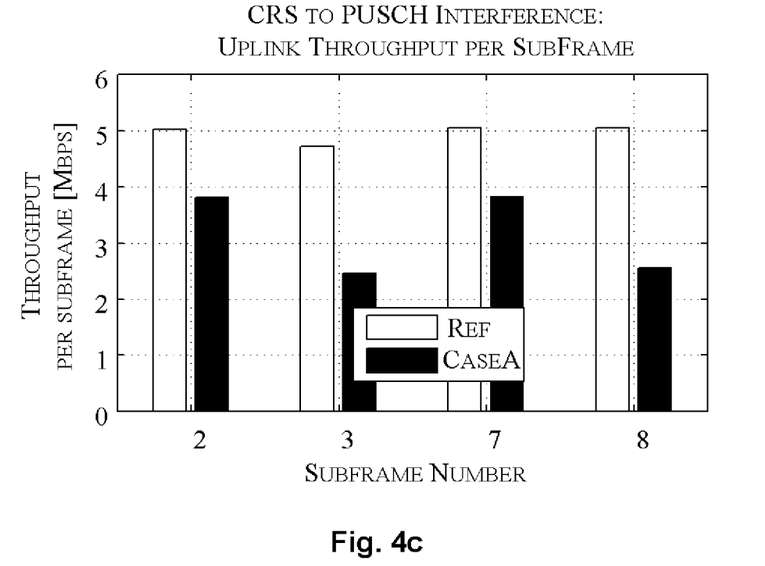
FIG. 4c illustrates uplink performance (uplink throughput per subframe) when there is only CRS to PUSCH interference.
Figure 5A:
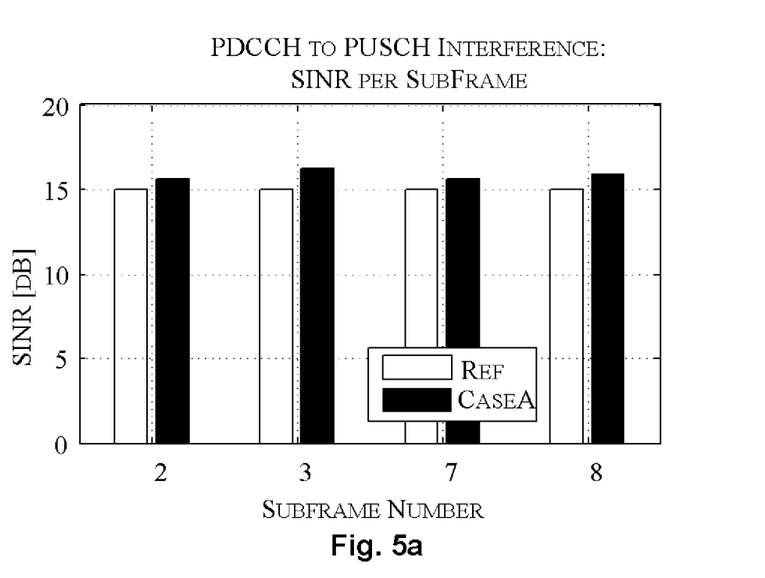
FIG. 5a illustrates uplink performance (SINR per subframe) when there are CRS to PUSCH interference and PDCCH to PUSCH interference.
Figure 5B:
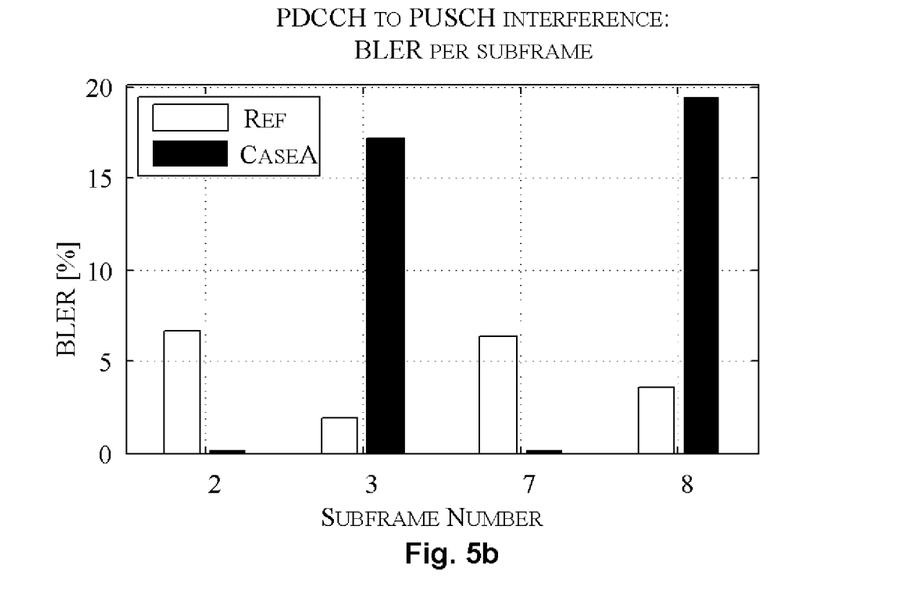
FIG. 5b illustrates uplink performance (BLER per subframe) when there are CRS to PUSCH interference and PDCCH to PUSCH interference.
Figure 5C:
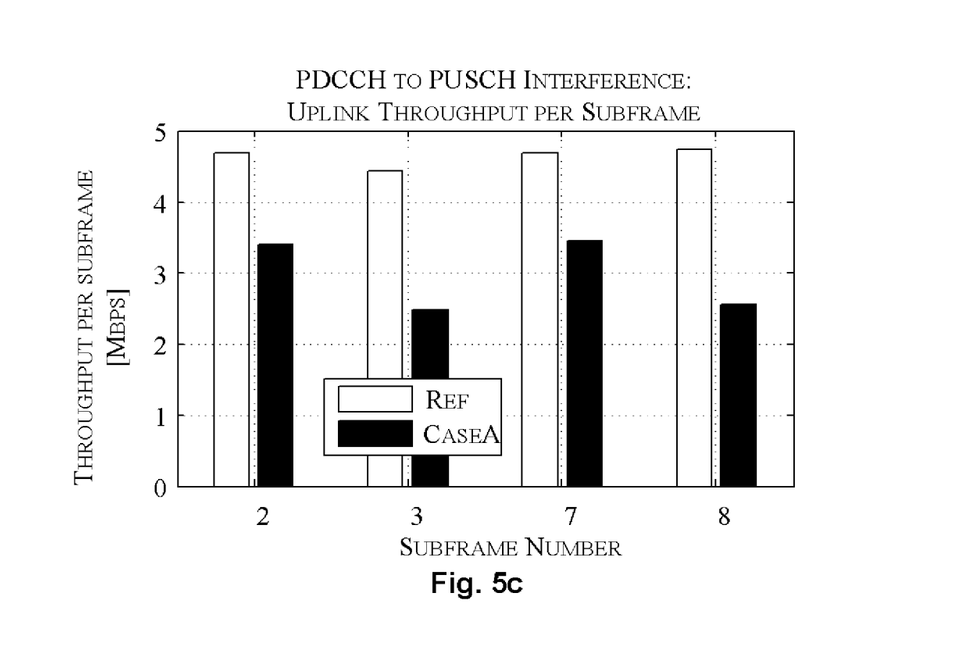
FIG. 5c illustrates uplink performance (uplink throughput per subframe) when there are CRS to PUSCH interference and PDCCH to PUSCH interference.

FIGS. 4 and 5 show measurements with two indoor pico cells when there are CRS interference and CRS+PDCCH interference from Cell B to Cell A, respectively. The brief configurations for the measurements of FIGS. 4 and 5 may be seen in the following Tables 1 and 2, respectively.

TABLE 1

Brief configurations for measurements of FIG. 4

|  | Ref | | Case A | |
| --- | --- | --- | --- | --- |
|  | Cell A | Cell B | Cell A | Cell B |
| UL DL subframe configuration traffic | DSUUD DSUUD Single full buffer uplink FTP UE | DSUUD DSUUD 0 UE | DSUUD DSUUD Single full buffer uplink FTP UE | DSUDD DSUDD 0 UE |

TABLE 2

Brief configurations for measurements of FIG. 5

|  | Ref | | Case A | |
| --- | --- | --- | --- | --- |
|  | Cell A | Cell B | Cell A | Cell B |
| UL DL subframe configuration traffic | DSUUD DSUUD Single full buffer uplink FTP UE | DSUUD DSUUD Single full buffer uplink FTP UE | DSUUD DSUUD Single full buffer uplink FTP UE | DSUDD DSUDD Single full buffer uplink FTP UE |

It can be seen that the uplink subframes 2, 7 are deteriorated due to the SINR overestimate in subframes 3 and 8 in Cell A, when there is CRS interference from Cell B and there is a single link adaptation loop in uplink.

There are similar issues for the link adaptation in downlink when there is strong UE to UE interference.

SUMMARY

According to the present disclosure, schemes are proposed to improve link adaptation in uplink and downlink respectively.

In a first aspect of the present disclosure, there is provided a method for performing link adaptation in an uplink subframe for a first cell. The method may include: obtaining interference to the uplink subframe of the first cell from at least one neighboring cell's downlink subframe occupying a time interval same as the uplink subframe; determining whether the obtained interference exceeds a predetermined threshold; and applying to the uplink subframe a first link adaptation loop when the obtained interference exceeds the predetermined threshold.

In one example, the method may further include: applying to the uplink subframe a second link adaptation loop when the obtained interference is below the predetermined threshold.

In another example, the first link adaptation loop may correspond to one of the neighboring cells, from which the obtained interference comes.

In yet another example, wherein the first link adaptation loop may be characterized by a first SINR compensation factor.

In this case, applying to the uplink subframe the first link adaptation loop may include selecting a Modulation and Coding Scheme (MCS) based on the first SINR compensation factor and a SINR actually measured in the uplink subframe.

Alternatively, the first SINR compensation factor may be based on CRC check results corresponding to transmissions when the obtained interference exceeds the predetermined threshold.

Alternatively, the second link adaptation loop may be characterized by a second SINR compensation factor.

In this case, applying to the uplink subframe the second link adaptation loop may include selecting the MCS based on the second SINR compensation factor and the SINR actually measured in the uplink subframe.

Alternatively, the second SINR compensation factor may be based on CRC check results corresponding to transmissions when the obtained interference is below the predetermined threshold.

In still another example, the interference may be indicated by strength of a Cell-specific Reference Signal (CRS). For example, the strength of the CRS may be RSRP of the CRS.

Alternatively, the interference may be indicated by strength of a Primary Synchronization Signal (PSS) or strength of a Secondary Synchronization Signal (SSS), or strength of CSI-RS.

In a second aspect of the present disclosure, there is provided a method for performing link adaptation in a downlink subframe for a first User Equipment (UE). The method may include: obtaining interference to the downlink subframe of the first UE from at least one neighboring cell UE's uplink subframe occupying a time interval same as the downlink subframe; determining whether the obtained interference exceeds a predetermined threshold; and applying to the downlink subframe a first link adaptation loop if the obtained interference exceeds the predetermined threshold.

In one example, the method may further include: applying to the downlink subframe a second link adaptation loop if the obtained interference is below the predetermined threshold.

In another example, the first link adaptation loop may correspond to one of the neighboring cell UEs, from which the obtained interference comes.

In yet another example, the first link adaptation loop may be characterized by a first SINR compensation factor.

In this case, applying to the downlink subframe a first link adaptation loop may include selecting a Modulation and Coding Scheme (MCS) based on the first SINR compensation factor and a SINR actually measured in the downlink subframe.

Alternatively, the first SINR compensation factor may be based on HARQ ACK/NACK feedbacks corresponding to transmissions when the obtained interference exceeds the predetermined threshold.

Alternatively, the second link adaptation loop may be characterized by a second SINR compensation factor.

In this case, applying to the downlink subframe the second link adaptation loop may include selecting the MCS based on the second SINR compensation factor and the SINR actually measured in the downlink subframe.

Alternatively, the second SINR compensation factor may be based on HARQ ACK/NACK feedbacks.

Alternatively, the interference may be indicated by strength of a PUSCH or PUCCH.

In a third aspect of the present disclosure, there is provided a link adaptation method comprising: applying a first link adaptation loop to a first set of subframes; and applying a second link adaptation loop to a second set of subframes.

In a fourth embodiment of the present disclosure, there is provided a base station for performing link adaptation in an uplink subframe for a first cell. The base station may include: an obtaining unit configured to obtain interference to the uplink subframe of the first cell from at least one neighboring cell's downlink subframe occupying a time interval same as the uplink subframe; a determining unit configured to determine whether the obtained interference exceeds a predetermined threshold; and a link adaptation unit configured to apply to the uplink subframe a first link adaptation loop when the obtained interference exceeds the predetermined threshold.

In a fifth embodiment of the present disclosure, there is provided a base station for performing link adaptation in a downlink subframe for a first User Equipment (UE). The base station may include: an obtaining unit configured to obtain interference to the downlink subframe of the first UE from at least one neighboring cell UE's uplink subframe occupying a time interval same as the downlink subframe; a determining unit configured to determine whether the obtained interference exceeds a predetermined threshold; and a link adaptation unit configured to apply to the downlink subframe a first link adaptation loop if the obtained interference exceeds the predetermined threshold.

In a sixth embodiment of the present disclosure, there is provided a link adaptation apparatus including a link adaptation unit, configured to apply a first link adaptation loop to a first set of subframes and to apply a second link adaptation loop to a second set of subframes.

The embodiments of the present disclosure at least lead to the following benefits and advantages:
  performance of uplink subframes that are not interfered by downlink transmissions of neighboring cells can be protected and ensured, and desired performance of uplink subframes that are interfered from the downlink transmissions of the neighboring cells can be achieved;
  performance of downlink subframes that are not interfered by uplink transmissions of neighboring cells' UEs can be protected and ensured, and desired performance of downlink subframes that are interfered from uplink transmissions of the neighboring cells' UE can be achieved; and
  low complexity in implementation.

BRIEF DESCRIPTION OF THE DRAWINGS

The above and other objects, features and advantages of the present disclosure will be clearer from the following detailed description about the non-limited embodiments of the present disclosure taken in conjunction with the accompanied drawings, in which.

DETAILED DESCRIPTION OF EMBODIMENTS

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

In the present disclosure, a link adaptation loop may refer to a kind of mechanism or policy applied in link adaptation in uplink or downlink.

Figure 6:
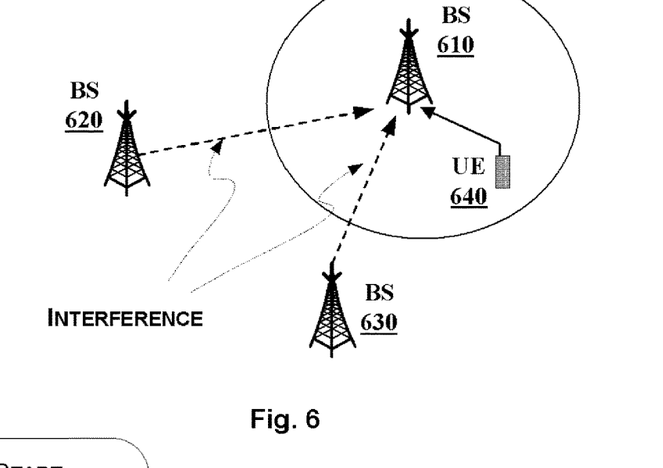
FIG. 6 illustrates an example wireless communication scenario where the present application may be applied.

FIG. 6 illustrates an example wireless communication scenario where the present application may be applied. As shown in FIG. 6, there are three base stations (denoted as BS 610, BS 620 and BS 630, respectively) and one UE (i.e., UE 640) served by BS 610. It will be appreciated that there may be less or more BSs, and there may be more than one UE.

For one subframe, it is assumed that it is configured as an uplink subframe for BS 610, i.e., there is an uplink transmission between BS 610 and UE 640, but it is configured as a downlink subframe for both of BS 620 and BS 630. In this case, as shown in FIG. 6, downlink transmissions of BS 620 and BS 630 in the subframe may interfere the uplink transmission between BS 610 and UE 640.

Figure 7:
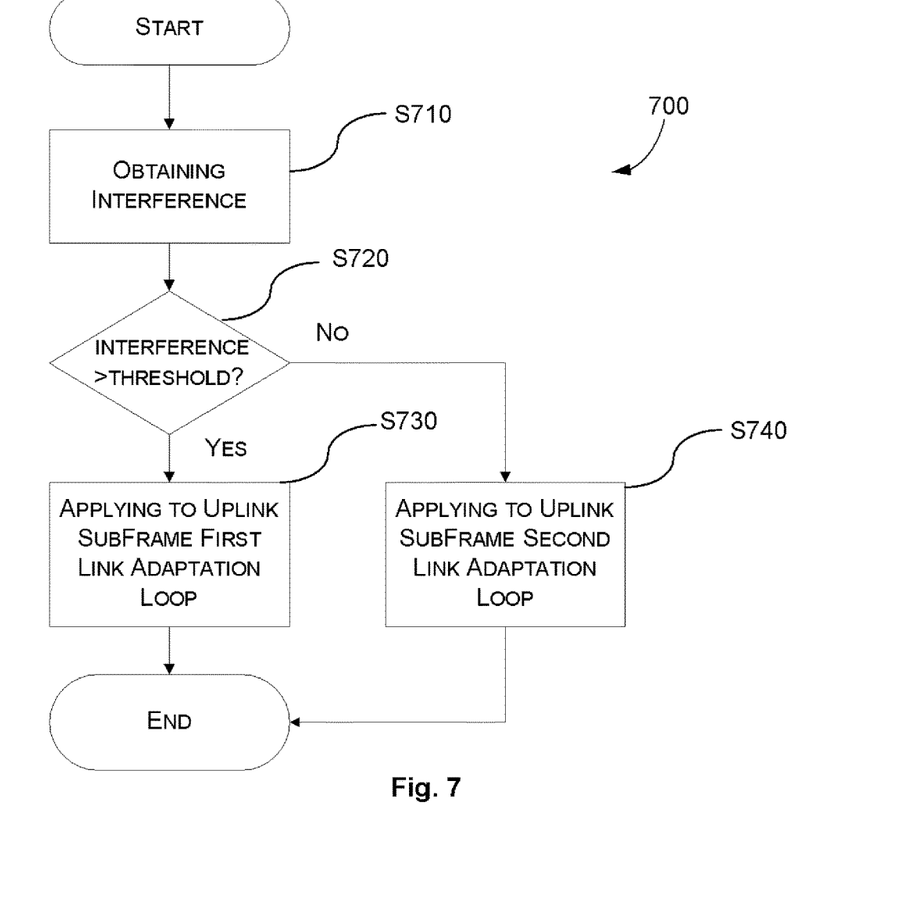
FIG. 7 illustrates a flowchart of a method for performing link adaptation in the uplink subframe according to a first embodiment of the present disclosure.

With FIG. 6 in mind, a method 700 for performing link adaptation in the uplink subframe according to a first embodiment of the present disclosure is illustrated in FIG. 7.

As shown in FIG. 7, BS 610 may obtain interference to the uplink subframe from at least one neighboring cell's downlink subframe occupying a time interval same as the uplink subframe (S710).

As an example, the interference may be indicated by strength of a Cell-specific Reference Signal (CRS). Preferably, the strength of the CRS may refer to RSRP of the CRS.

As another example, the interference may be indicated by strength of a Primary Synchronization Signal (PSS) or strength of a Secondary Synchronization Signal (SSS), or strength of CSI-RS etc.

Moreover, the interference may be determined according to the notification (e.g., over X2) between the neighboring cells.

Then, BS 610 may determine whether the obtained interference exceeds a predetermined threshold (S720).

When the obtained interference exceeds the predetermined threshold, BS 610 may apply to the uplink subframe a first link adaptation loop (S730, YES branch of S720).

As a non-limiting example, the first link adaptation loop here may be characterized by a first SINR compensation factor, such as $\Delta_{adapted}$ noted previously. In this case, the operation of applying the first link adaptation loop to the uplink subframe may include selecting a Modulation and Coding Scheme (MCS) based on the first SINR compensation factor and a SINR actually measured in the uplink subframe.

Alternatively, the first SINR compensation factor may be based on CRC check results corresponding to transmissions when the obtained interference exceeds the predetermined threshold.

Optionally, the method 700 may further comprise a step of applying to the uplink subframe a second link adaptation loop when the obtained interference is below the predetermined threshold (S740, No branch of S720).

As a non-limiting example, the second link adaptation loop may be characterized by a second SINR compensation factor, such as $\Delta_{adapted}$ as noted previously. In this case, the step of applying to the uplink subframe the second link adaptation loop may include selecting the MCS based on the second SINR compensation factor and the SINR actually measured in the uplink subframe. Moreover, the second SINR compensation factor may be based on CRC check results corresponding to transmissions when the obtained interference is below the predetermined threshold.

For example, when being taken as $\Delta_{adapted}$, the first/second SINR compensation factor may be adapted based on CRC check results corresponding to uplink transmissions over a corresponding uplink subframe according to Equation 3. Parameters for the link adaption of each uplink subframe are not necessarily the same, including, e.g., the BLER target, the target number of HARQ transmission attempts, and initial delta value etc.

With the method 700, the uplink subframes of each UE may be divided into different uplink subframe groups. There is one uplink link adaptation loop for each uplink subframe group of a UE. In the following, a detailed scheme of an example is presented on how to divide the uplink sub-frames into different uplink subframe groups and apply a separate uplink link adaptation loop for each group.

When there is CRS (or other downlink physical channels as well) of either neighboring cell detected and strength of the CRS (e.g., RSRP) exceeds a predetermined threshold in an uplink subframe, the uplink subframe may be extracted from a default uplink subframe group:

If there is no existing uplink subframe group that experiences the interference from the downlink transmission of the neighboring cell(s) mentioned above, a new group of uplink subframes may be setup and a new link adaptation loop is created for this uplink subframe group.

Otherwise, when there is an existing uplink subframe group that experiences the interference from the neighboring cell(s) mentioned above as the extracted uplink subframe, the extracted uplink subframe may be added into the existing uplink subframe group. Then, the link adaptation loop for this existing uplink subframe group also applies for the newly added subframe.

Similarly, if each uplink subframe belongs to an existing uplink subframe group, the cell may monitor if the interference source has changed. Specifically, if the interference from downlink transmission of the neighboring cell(s) disappears, e.g., the measured RSRP'(s) of the interfering neighbor cell(s) is below a predetermined threshold, the uplink subframe should be extracted from the present uplink subframe group and included to the default uplink subframe group.

Moreover, each link adaptation loop may correspond to one neighboring cell from which the measured interference comes (i.e., interfering neighboring cell). For example, if interference changes to be from downlink transmission of another cell, the uplink subframe may be included into another uplink subframe group with the same interfering source (if such an uplink subframe group exists) and the link adaptation loop for this uplink subframe group may be applied to the newly added subframe immediately. Otherwise, a new uplink subframe group may be setup and the uplink subframe will be included into the new uplink subframe group.

As one example, when there are two neighboring cells as shown in FIG. 1, Subframes 3, 8 are included as one uplink subframe group while Subframe 2 and 7 are included as another uplink subframe group. For each uplink subframe group, one separate link adaptation loop is created and maintained based on the PUSCH CRC check results corresponding to the uplink subframes belonging to the uplink subframe group.

In this way, the uplink system performance can be improved to protect the uplink subframes that are not interfered by the downlink transmission of neighboring cells from the uplink subframes that are interfered by the downlink transmission of neighboring cells; and to achieve the desired performance of the uplink subframes that are interfered by the downlink transmission of neighboring cells.

Figure 8:
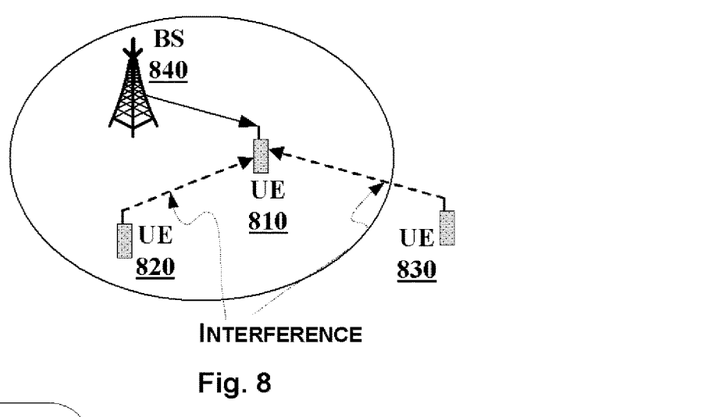
FIG. 8 illustrates another example wireless communication scenario where the present application may be applied.

FIG. 8 illustrates another example wireless communication scenario where the present application may be applied. As shown in FIG. 8, there are three UEs (denoted as UE 810, UE 820 and UE 830, respectively) and one base station (i.e., BS 840), wherein US 810 is served by BS 810, and UE 820 and UE 830 are both neighboring cells' UEs. It will be appreciated that there may be less or more UEs, and there may be more than one BS.

For one subframe, assume that it is configured as a downlink subframe for BS 840, i.e., there is a downlink transmission between BS 840 and UE 810, but it is configured as an uplink subframe for BS 840's neighboring cells, i.e., being uplink subframes for both UE 820 and UE 830. In this case, as shown in FIG. 8, uplink transmissions for UE 820 and UE 830 in the subframe may interfere the downlink transmission between BS 840 and UE 810.

Figure 9:
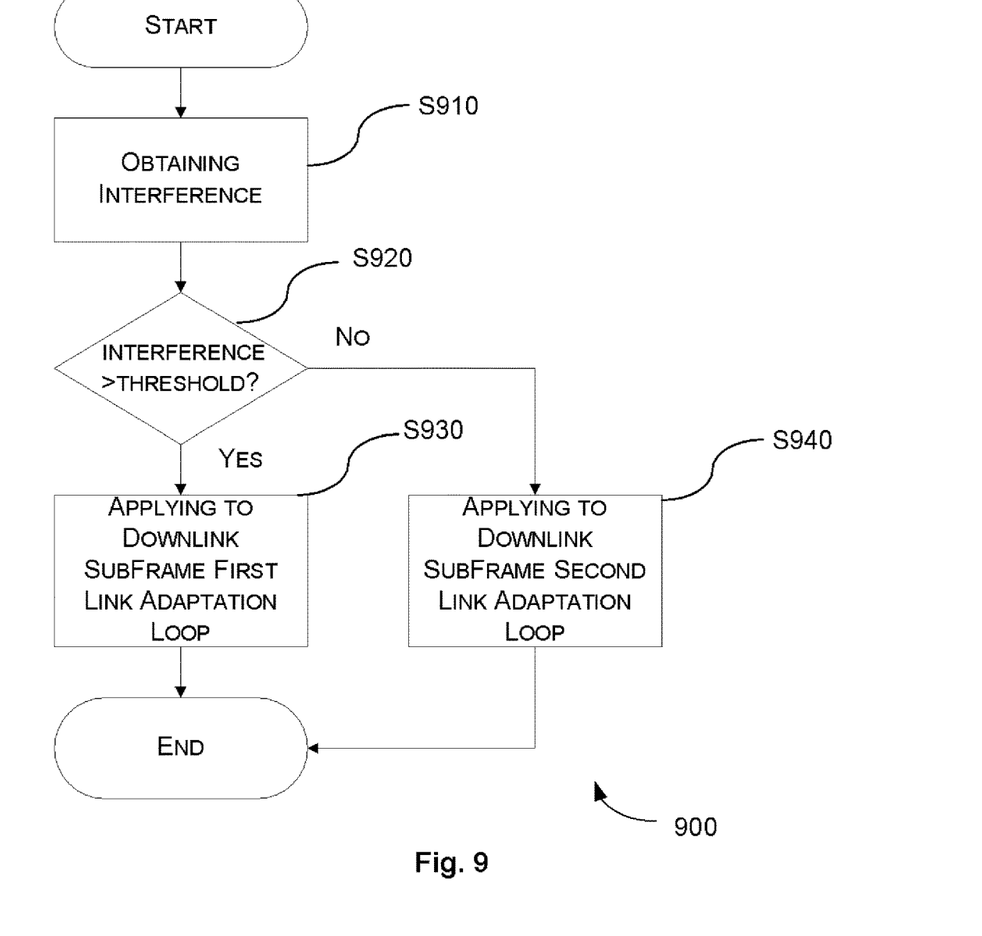
FIG. 9 illustrates a flowchart of a method for performing link adaptation in the uplink downlink according to a second embodiment of the present disclosure.

With FIG. 8 in mind, a method 800 for performing link adaptation in the uplink downlink according to a second embodiment of the present disclosure is illustrated in FIG. 9.

As shown in FIG. 9, BS 840 may obtain interference to the downlink subframe from at least one neighboring cell UE's uplink subframe occupying a time interval same as the downlink subframe (S910).

As an example, the interference may be indicated by strength of a PUSCH or PUCCH.

Moreover, the interference may be either measured by BS 840 based on reports from UEs (such as UE 810), or measured by the UEs and then reported to BS 840.

Then, BS 840 may determine whether the obtained interference exceeds a predetermined threshold (S920).

When the obtained interference exceeds the predetermined threshold, BS 840 may apply to the downlink subframe a first link adaptation loop (S930, YES branch of S920).

As a non-limiting example, the first link adaptation loop here may be characterized by a first SINR compensation factor, such as $\Delta_{adapted}$ noted previously. In this case, the operation of applying the first link adaptation loop to the downlink subframe may include selecting a Modulation and Coding Scheme (MCS) based on the first SINR compensation factor and a SINR actually measured in the downlink subframe.

Alternatively, the first SINR compensation factor may be based on HARQ ACK/NACK feedbacks corresponding to transmissions when the obtained interference exceeds the predetermined threshold.

Optionally, the method 900 may further comprise a step of applying to the downlink subframe a second link adaptation loop when the obtained interference is below the predetermined threshold (S940, No branch of S920).

As a non-limiting example, the second link adaptation loop may be characterized by a second SINR compensation factor, such as $\Delta_{adapted}$ as noted previously. In this case, the step of applying to the downlink subframe the second link adaptation loop may include selecting the MCS based on the second SINR compensation factor and the SINR actually measured in the downlink subframe. Moreover, the second SINR compensation factor may be based on HARQ ACK/NACK feedbacks corresponding to transmissions when the obtained interference is below the predetermined threshold.

For example, when being taken as $\Delta_{adapted}$, the first/second SINR (or equivalently CQI) compensation factor may be adapted based on HARQ ACK/NACK feedbacks corresponding to downlink transmissions over a corresponding downlink subframe according to Equation 3. Parameters for the link adaption of each downlink subframe are not necessarily the same, including, e.g., the BLER target, the target number of HARQ transmission attempts, and initial delta value etc.

With such a method, the downlink system performance can be improved to protect the downlink subframes that are not interfered by the uplink transmission of neighboring cells' UEs from the downlink subframes that are interfered by the uplink transmission of neighboring cells' UEs; and to achieve the desired performance of the downlink subframes that are interfered by the uplink transmission of neighboring cells' UEs.

Figure 10A:
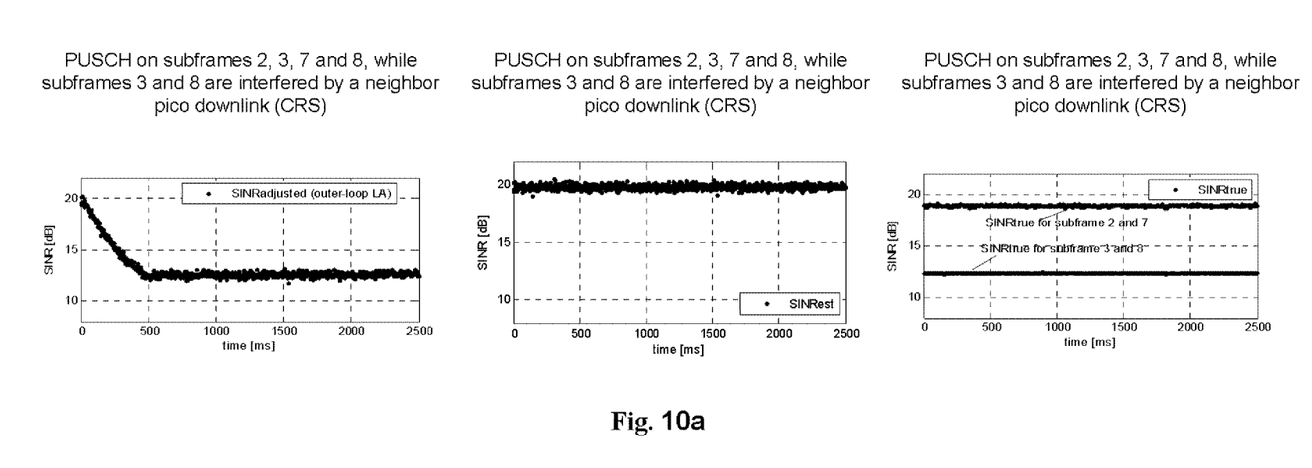
FIG. 10a shows simulation results with a single link adaptation loop according to the prior art.
Figure 10B:
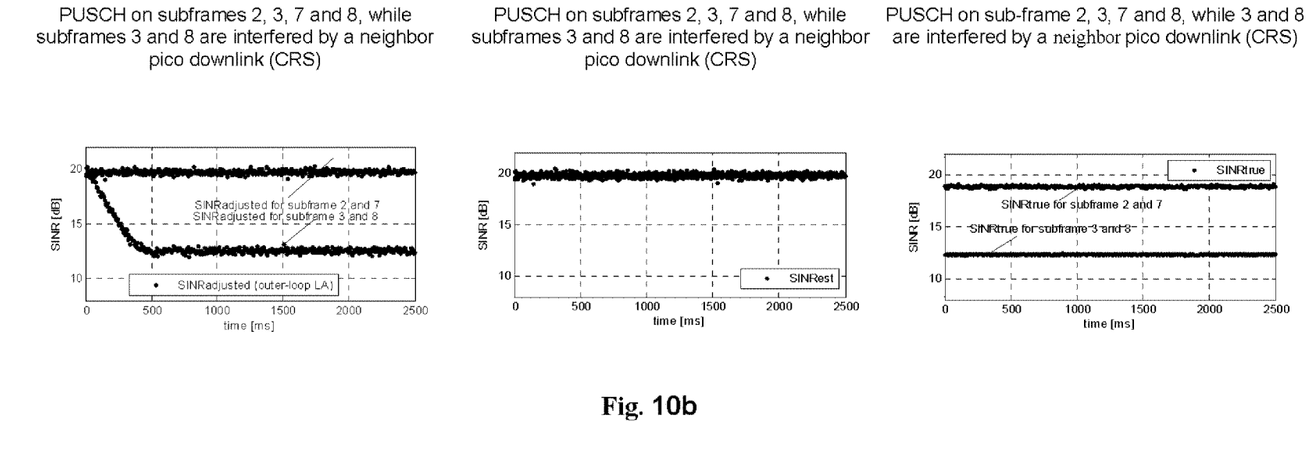
FIG. 10b shows simulation results with dual link adaptation loops according to the present application.

The benefits of the present application's link adaptation loop in uplink over the prior art will be described with reference to FIG. 10. FIG. 10*a* shows simulation results with a single link adaptation loop according to the prior art, and FIG. 10*b* shows simulation results with dual link adaptation loops according to the present application. As illustrated, performance of subframes 2 and 7 can be protected in the case of the dual link adaptation loops.

Figure 11:
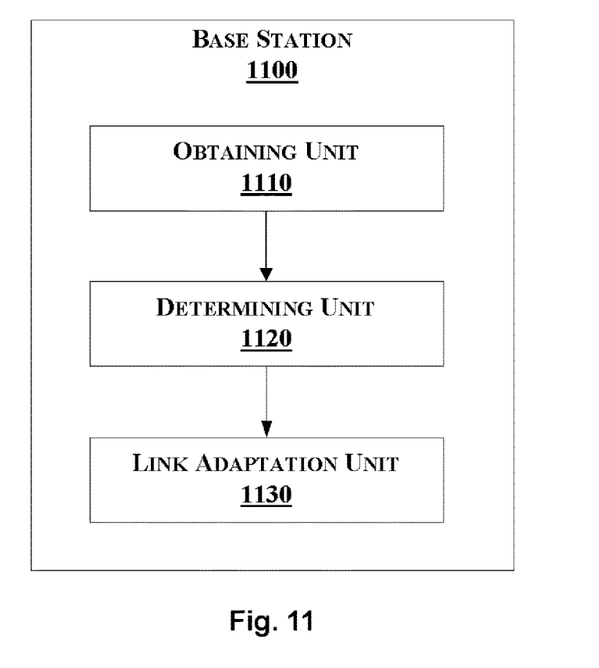
FIG. 11 illustrates a block diagram illustrating a base station 1100 for performing link adaptation in an uplink subframe for a first cell according to a third embodiment of the present disclosure.

FIG. 11 is a block diagram illustrating a base station 1100 for performing link adaptation in an uplink subframe for a first cell according to a third embodiment of the present disclosure. The base station 1100 may include an obtaining unit 1110, a determining unit 1120 and a link adaptation unit 1130.

The obtaining unit 1110 may be configured to obtain interference to the uplink subframe of the first cell from at least one neighboring cell's downlink subframe occupying a time interval same as the uplink subframe.

As an example, the interference may be indicated by strength of a Cell-specific Reference Signal (CRS). Preferably, the strength of the CRS may refer to RSRP of the CRS.

As another example, the interference may be indicated by strength of a Primary Synchronization Signal (PSS) or strength of a Secondary Synchronization Signal (SSS), or strength of CSI-RS etc.

Moreover, the interference may be determined according to the notification (e.g., over X2) between the neighboring cells.

The determining unit 1120 may be configured to determine whether the obtained interference exceeds a predetermined threshold.

The link adaptation unit 1130 may be configured to apply to the uplink subframe a first link adaptation loop when it is determined by the determining unit 1120 that the obtained interference exceeds the predetermined threshold.

As a non-limiting example, the first link adaptation loop here may be characterized by a first SINR compensation factor, such as $\Delta_{adapted}$ noted previously. In this case, the link adaptation unit 1130 may include a first selecting unit (not shown) configured to select a Modulation and Coding Scheme (MCS) based on the first SINR compensation factor and a SINR actually measured in the uplink subframe.

Alternatively, the first SINR compensation factor may be based on CRC check results corresponding to transmissions when the obtained interference exceeds the predetermined threshold.

Optionally, the link adaptation unit 1130 may be further configured to apply to the uplink subframe a second link adaptation loop when the obtained interference is below the predetermined threshold.

As a non-limiting example, the second link adaptation loop may be characterized by a second SINR compensation factor, such as $\Delta_{adapted}$ as noted previously. In this case, the link adaptation unit 1130 may include a second selecting unit (not shown) configured to select the MCS based on the second SINR compensation factor and the SINR actually measured in the uplink subframe. Moreover, the second SINR compensation factor may be based on CRC check results corresponding to transmissions when the obtained interference is below the predetermined threshold.

Figure 12:
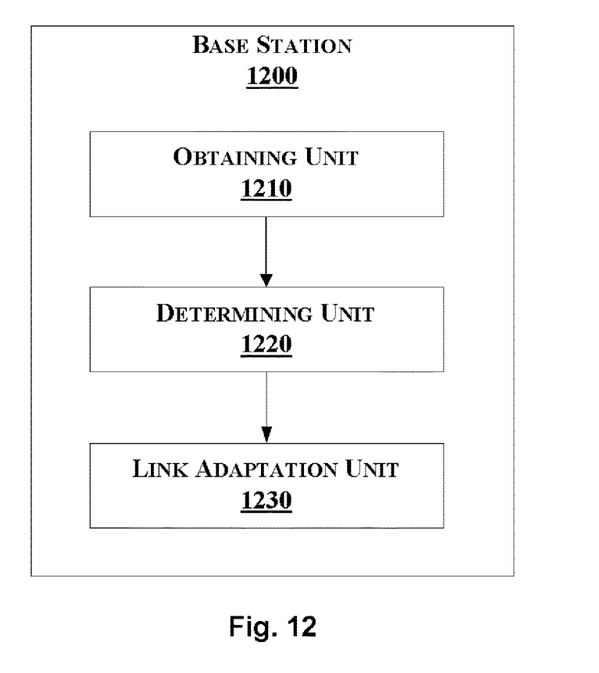
FIG. 12 illustrates a block diagram illustrating a base station 1200 for performing link adaptation in an uplink subframe for a first cell according to a fourth embodiment of the present application.

FIG. 12 is a block diagram illustrating a base station 1200 for performing link adaptation in an uplink subframe for a first cell according to a fourth embodiment of the present application. The base station 1200 may include an obtaining unit 1210, a determining unit 1220 and a link adaptation unit 1230.

The obtaining unit 1210 may be configured to obtain interference to the downlink subframe of the first UE from at least one neighboring cell UE's uplink subframe occupying a time interval same as the downlink subframe.

As an example, the interference may be indicated by strength of a PUSCH or PUCCH.

Moreover, the interference may be either measured by the base station 1200 based on reports from UEs, or measured by UEs and then reported to the base station 1200.

The determining unit 1220 may be configured to determine whether the obtained interference exceeds a predetermined threshold.

The link adaptation unit 1230 may be configured to apply to the downlink subframe a first link adaptation loop if the obtained interference exceeds the predetermined threshold.

As a non-limiting example, the first link adaptation loop here may be characterized by a first SINR compensation factor, such as $\Delta_{adapted}$ noted previously. In this case, the link adaptation unit 1230 may include a first selecting unit (not shown) configured to select a Modulation and Coding Scheme (MCS) based on the first SINR compensation factor and a SINR actually measured in the downlink subframe.

Alternatively, the first SINR compensation factor may be based on HARQ ACK/NACK feedbacks corresponding to transmissions when the obtained interference exceeds the predetermined threshold.

Optionally, the link adaptation unit 1230 may be further configured to apply to the downlink subframe a second link adaptation loop if the obtained interference is below the predetermined threshold.

As a non-limiting example, the second link adaptation loop may be characterized by a second SINR compensation factor, such as $\Delta_{adapted}$ as noted previously. In this case, the link adaptation unit 1230 may include a second selecting unit (not shown) configured to select the MCS based on the second SINR compensation factor and the SINR actually measured in the downlink subframe. Moreover, the second SINR compensation factor may be based on HARQ ACK/NACK feedbacks corresponding to transmissions when the obtained interference is below the predetermined threshold.

For example, when being taken as $\Delta_{adapted}$, the first/second SINR (or equivalently CQI) compensation factor may be adapted based on HARQ ACK/NACK feedbacks corresponding to downlink transmissions over a corresponding downlink subframe according to Equation 3. Parameters for the link adaption of each downlink subframe are not necessarily the same, including, e.g., the BLER target, the target number of HARQ transmission attempts, and initial delta value etc.

It should be noted that two or more different units in this disclosure may be logically or physically combined. For example, the base station 1100 and the base station 1200 may be combined as one single unit.

It should be emphasized that the term "unit" when used in this disclosure is taken to be implemented in many different forms of software, firmware and hardware in the embodiments illustrated in the figures.

According to foregoing embodiments of the present application, the present application may achieve the following advantages:

performance of uplink subframes that are not interfered by downlink transmissions of neighboring cells can be protected and ensured, and desired performance of uplink subframes that are interfered from the downlink transmissions of the neighboring cells can be achieved;

performance of downlink subframes that are not interfered by uplink transmissions of neighboring cells' UEs can be protected and ensured, and desired performance of downlink subframes that are interfered from uplink transmissions of the neighboring cells' UE can be achieved; and low complexity in implementation.

Other arrangements of the present disclosure include software programs performing the steps and operations of the method embodiments, which are firstly generally described and then explained in detail. More specifically, a computer program product is such an embodiment, which includes a computer-readable medium with a computer program logic encoded thereon. The computer program logic provides corresponding operations to provide the above described link adaptation scheme when it is executed on a computing device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g., CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g., a group of data communication devices or computing devices in other entities can also provide the units of the present disclosure. The units according to the present disclosure can also be distributed among a plurality of software processes on a plurality of data communication devices, or all software processes running on a group of mini specific computers, or all software processes running on a single computer.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

3GPP $3^{rd}$ Generation Partnership Project
BLER BLock Error Rate
CFI Control Format Indicator
CP Cyclic Prefix
CRC Cyclic Redundancy Check
CRS Cell-specific Reference Signal
CSI-RS Channel Status Information Reference Signal
DL DownLink
DM-RS DeModulation-Reference Signal
HARQ Hybrid Automatic Repeat Request
LB Long Block
RS Reference Signal
MCS Modulation and Coding Scheme
MIIT Ministry of Industry and Information Technology
IRC interference Rejection Combiner
PDCCH Physical Downlink Control Channel PDSCH Physical Downlink Shared Channel
PUSCH Physical Uplink Shared Channel
PUCCH Physical Uplink Control Channel
PRB Physical Resource Block
RSRP Reference Signal Receiving Power
RX receive
SINR Signal to Interference and Noise Ratio
TDD Time Division Duplex
UE User Equipment
UL UpLink

The invention claimed is:

1. A method for performing link adaptation in an uplink subframe for a first cell, the method comprising:
   obtaining information indicating interference to the uplink subframe of the first cell from at least one neighboring cell's downlink subframe occupying a time interval same as the uplink subframe;
   determining whether the interference exceeds a predetermined threshold;
   applying, to the uplink subframe, a first link adaptation loop by selecting a Modulation and Coding Scheme (MCS) based on a Signal to Interference and Noise Ratio (SINR) measured in the uplink subframe and a first SINR compensation factor, when the interference exceeds the predetermined threshold; and
   applying, to the uplink subframe, a second link adaptation loop, when the interference is below the predetermined threshold.

2. The method according to claim 1, wherein the first link adaptation loop corresponds to one of the neighboring cells, from which the obtained information indicating the interference comes.

3. The method according to claim 1, wherein the first link adaptation loop is characterized by the first SINR compensation factor.

4. The method according to claim 1, wherein the first SINR compensation factor is based on Cyclic Redundancy Check (CRC) check results corresponding to transmissions, when the interference exceeds the predetermined threshold.

5. The method according to claim 1, wherein the interference is indicated by strength of a Cell-specific Reference Signal (CRS).

6. The method according to claim 5, wherein the strength of the CRS is Reference Signal Receiving Power (RSRP) of the CRS.

7. The method according to claim 1, wherein the interference is indicated by strength of a Primary Synchronization Signal (PSS) or strength of a Secondary Synchronization Signal (SSS) or strength of Channel Status Information-Reference Signal (CSI-RS).

8. A method for performing link adaptation in a downlink subframe for a first User Equipment (UE), the method comprising:
   obtaining information indicating interference to the downlink subframe of the first UE from at least one neighboring cell UE's uplink subframe occupying a time interval same as the downlink subframe;
   determining whether the interference exceeds a predetermined threshold;
   applying, to the downlink subframe, a first link adaptation loop by selecting a Modulation and Coding Scheme (MCS) based on a Signal to Interference and Noise Ratio (SINR) measured in the downlink subframe and a first SINR compensation factor, if the interference exceeds the predetermined threshold; and
   applying, to the downlink subframe, a second link adaptation loop, if the interference is below the predetermined threshold.

9. The method according to claim 8, wherein the first link adaptation loop corresponds to one of the neighboring cell UEs, from which the obtained information indicating the interference comes.

10. The method according to claim 8, wherein the first link adaptation loop is characterized by the first SINR compensation factor.

11. The method according to claim 10, wherein the first SINR compensation factor is based on Hybrid Automatic Repeat Request (HARQ) ACK/NACK feedbacks corresponding to transmissions, when the interference exceeds the predetermined threshold.

12. The method according to claim 8, wherein the interference is indicated by strength of a Physical Uplink Shared Channel (PUSCH) or Physical Uplink Control Channel (PUCCH).

13. A link adaptation method comprising:
    applying a first link adaptation loop to a first set of subframes by selecting a Modulation and Coding Scheme (MCS) based on a Signal to Interference and Noise Ratio (SINR) measured at least in one of the first set of subframes and a first SINR compensation factor; and
    applying a second link adaptation loop to a second set of subframes.

14. A base station for performing link adaptation in an uplink subframe for a first cell, the base station comprising:
    one or more processors configured to:
    obtain information indicating interference to the uplink subframe of the first cell from at least one neighboring cell's downlink subframe occupying a time interval same as the uplink subframe;
    determine whether the interference exceeds a predetermined threshold; and
    apply, to the uplink subframe, a first link adaptation loop by selecting a Modulation and Coding Scheme (MCS) based on a Signal to Interference and Noise Ration (SINR) measured in the uplink subframe and a first SINR compensation factor, when the interference exceeds the predetermined threshold, and apply, to the uplink subframe, a second link adaptation loop, when the interference is below the predetermined threshold.

15. The base station according to claim 14, wherein the first link adaptation loop corresponds to one of the neighboring cells, from which the obtained information indicating the interference comes.

16. The base station according to claim 14, wherein the first link adaptation loop is characterized by the first SINR compensation factor.

17. The base station according to claim 16, wherein the first SINR compensation factor is based on Cyclic Redundancy Check (CRC) check results corresponding to transmissions, when the interference exceeds the predetermined threshold.

18. The base station according to claim 14, wherein the second link adaptation loop is characterized by a second SINR compensation factor.

19. The base station according to claim 18, wherein the one or more processors are further configured to select the MCS based on the second SINR compensation factor and the SINR actually measured in the uplink subframe.

20. The base station according to claim 18, wherein the second SINR compensation factor is based on Cyclic Redundancy Check (CRC) check results corresponding to transmissions, when the interference is below the predetermined threshold.

21. The base station according to claim 14, wherein the interference is indicated by strength of a Cell-specific Reference Signal (CRS).

22. The base station according to claim 21, wherein the strength of the CRS is Reference Signal Receiving Power (RSRP) of the CRS.

23. The base station according to claim 14, wherein the interference is indicated by strength of a Primary Synchronization Signal (PSS) or strength of a Secondary Synchronization Signal (SSS) or strength of Channel Status Information-Reference Signal (CSI-RS).

24. A base station for performing link adaptation in a downlink subframe for a first User Equipment (UE), the base station comprising:
one or more processors configured to:
obtain information indicating interference to the downlink subframe of the first UE from at least one neighboring cell UE's uplink subframe occupying a time interval same as the downlink subframe;
determine whether the interference exceeds a predetermined threshold; and
apply, to the downlink subframe, a first link adaptation loop by selecting a Modulation and Coding Scheme (MCS) based on a Signal to Interference and Noise Ratio (SINR) measured in the downlink subframe and a first SINR compensation factor, if the interference exceeds the predetermined threshold, and apply, to the downlink subframe, a second link adaptation loop, if the interference is below the predetermined threshold.

25. The base station according to claim 24, wherein the first link adaptation loop corresponds to one of the neighboring cell UEs, from which the obtained information indicating the interference comes.

26. The base station according to claim 24, wherein the first link adaptation loop is characterized by the first SINR compensation factor.

27. The base station according to claim 26, wherein the first SINR compensation factor is based on Hybrid Automatic Repeat Request (HARQ) ACK/NACK feedbacks corresponding to transmissions, when the interference exceeds the predetermined threshold.

28. The base station according to claim 24, wherein the second link adaptation loop is characterized by a second SINR compensation factor.

29. The base station according to claim 28, wherein the one or more processors are further configured to select the MCS based on the second SINR compensation factor and the SINR actually measured in the downlink subframe.

30. The base station according to claim 28, wherein the second SINR compensation factor is based on Hybrid Automatic Repeat Request (HARQ) ACK/NACK feedbacks corresponding to transmissions, when the interference is below the predetermined threshold.

31. The base station according to claim 24, wherein the interference is indicated by strength of a Physical Uplink Shared Channel (PUSCH) or Physical Uplink Control Channel (PUCCH).

32. A link adaptation apparatus comprising one or more processors configured to apply a first link adaptation loop to a first set of subframes by selecting a Modulation and Coding Scheme (MCS) based on a Signal to Interference and Noise Ratio (SINR) measured at least in one of the first set of subframes and a first SINR compensation factor, and to apply a second link adaptation loop to a second set of subframes.

* * * * *